United States Patent [19]

Schoenberg et al.

[11] Patent Number: 4,506,100
[45] Date of Patent: Mar. 19, 1985

[54] AROMATIC DIAMINES

[75] Inventors: Jules E. Schoenberg, Scotch Plains, N.J.; Stephen P. Anderson, South Gate, Calif.

[73] Assignee: National Starch and Chemical Corporation, Bridgewater, N.J.

[21] Appl. No.: 405,218

[22] Filed: Aug. 4, 1982

Related U.S. Application Data

[62] Division of Ser. No. 292,257, Aug. 12, 1981, Pat. No. 4,405,770.

[51] Int. Cl.$^3$ .................. C07C 87/50; C07C 85/11
[52] U.S. Cl. .................................. 564/430; 564/418
[58] Field of Search ........................................ 564/430

[56] References Cited

U.S. PATENT DOCUMENTS

| | | | |
|---|---|---|---|
| 3,179,634 | 4/1965 | Edwards | 260/78 |
| 3,190,856 | 6/1965 | Lavin et al. | 260/65 |
| 3,528,950 | 9/1970 | Lubowitz | 260/78.4 |
| 3,576,691 | 4/1971 | Meyers | 156/309 |
| 3,609,123 | 9/1971 | Rabilloud et al. | 260/47 |
| 3,708,439 | 1/1973 | Sayigh et al. | 564/430 X |
| 3,844,956 | 10/1974 | Nnadi | 564/430 X |
| 3,879,349 | 4/1975 | Bilow et al. | 260/47 |
| 3,928,450 | 12/1975 | Bilow et al. | 564/430 |
| 3,944,575 | 3/1976 | Villaescusa et al. | 564/430 X |
| 4,196,144 | 4/1980 | Darms | 564/430 |
| 4,287,125 | 9/1981 | Soula | 564/430 X |

OTHER PUBLICATIONS

W. Dilthey et al., "Die Wirkung der Nitrogruppe auf die Salzfarbe Positiver Ionen", Heteropolare Kohlenstoffverbindungen XIII, pp. 189–205, (Nov. 26, 1930).

Primary Examiner—Paul F. Shaver
Attorney, Agent, or Firm—Edwin M. Szala; Margaret B. Kelley

[57] ABSTRACT

Novel polyimides, optionally end-capped with polymerizable or inert groups, and the polyamic acid or ester intermediates thereof are prepared by reacting a tetracarboxylic acid compound (e.g. pyromellitic dianhydride or 3,3',4,4'-benzophenone tetracarboxylic acid dianhydride or its methyl diester) with diamines having the general formula

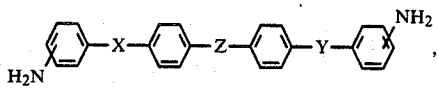

wherein Z is oxygen or sulfur, X and/or Y are carbonyl or carbinol groups, the amine groups may be in the 2-, 3-, and/or 4-position, and isomerism is present when X and/or Y is a carbinol group. The polyimides may be end-capped by reaction, during or after their formation, with polymerizable groups such as 3-aminophenyl acetylene or 3,6-endomethylene-1,2,3,6-tetrahydrophthalic anhydride. The diamines are novel classes of amines when Z is sulfur and X and/or Y are carbonyl or carbinol groups and when Z is oxygen and X, Y, or X and Y are carbinol groups.

11 Claims, No Drawings

AROMATIC DIAMINES

This application is a division of application Ser. No. 292,257, filed 8/12/81 now U.S. Pat. No. 4,405,770.

BACKGROUND OF THE INVENTION

This invention relates to novel polyimides, to end-capped polyimides, and to the polyamic acid and ester intermediates thereof. It also relates to their use as adhesives or molded articles. It further relates to novel primary aromatic diamines for use in the preparation of the polymers.

Polyimides are synthetic organic resins characterized by repeating imide linkages in the polymer chain which may or may not be end-capped with polymerizable or inert (i.e. non-polymerizable) chemical groups. They are available in both linear and crosslinked forms and are noted for their outstanding chemical and physical properties, particularly their high temperature oxidative stability and strength. In addition to their use as adhesives and molded articles, they may be used as precured films and fibers, curable enamels, and laminating resins.

The polyimides, especially the preferred aromatic polymides, are extremely difficult to process due to their insolubility and extremely high softening points. Early attempts to decrease the softening temperature usually involved the substitution of aliphatic segments into the otherwise aromatic polymers, but this generally resulted in an accompanying decrease in thermooxidative stability. In order to overcome these disadvantages and to improve their processability and mechanical properties, it has been found advantageous to introduce flexibilizing moieties, such as bipyridyl, sulfone, alkylene, or preferably ether or thio bridges, into the polymer chain and thus provide a product with improved flexibility and impact strength. Crosslinking moieties have also been introduced into the polymers by the use of some portion of a more highly functional amine (e.g. triamine) or by the introduction of carboxyl or hydroxyl groups.

A further disadvantage exists if the polyamic acid or ester intermediates will not be used immediately. The solutions, preferably concentrated, must be stored at low temperatures and protected from moisture to prevent premature imidization (i.e. ring closure). In addition, during curing to the fully or partially imidized resin, an appreciable amount of a volatile by-product (e.g. water, alcohol, or hydrohalides depending upon the starting tetracarboxylic acid compound) is formed. This leads to the formation of voids when the resin is used as an adhesive between metal substrates or for forming molded articles. In order to overcome these disadvantages, low molecular weight polyimides end-capped with polymerizable groups such as ethylenically unsaturated groups, have been prepared. These end-capped polyimides can be subsequently cured to void-free, higher molecular weight resins since no volatile by-product is formed.

It is a purpose of this invention to provide novel linear, optionally crosslinked, polyimides which contain flexibilizing moieties and which may be, if desired, end-capped with polymerizable or inert groups. It is also an object to provide improved adhesives and molded articles. It is a further object to provide novel primary aromatic diamines for use in the preparation of the polyimides and the polyamic acid or ester intermediates.

SUMMARY OF THE INVENTION

In the first embodiment herein, the novel polyimides are prepared by reacting a tetracarboxylic acid compound, e.g. dianhydrides or diester-diacids, with selected primary aromatic diamines containing a thio or ether bridge, as well as carbonyl and/or carbinol bridges. Typically the reaction is carried out in an inert organic solvent at a temperature which will depend upon the tetracarboxylic compound used. The solution containing the soluble polyamic acid or ester intermediate is heated to a temperature sufficient to effect ring closure to the corresponding polyimide and, if desired, to remove the solvent as well as the by-product(s). If the polyamic acid or ester is insoluble or has partially imidized and come out of solution, it can be recovered and then converted to the fully imidized form by heating.

These polyimides are characterized by having recurring units of the formula $\{A-B\}_n$, wherein A is

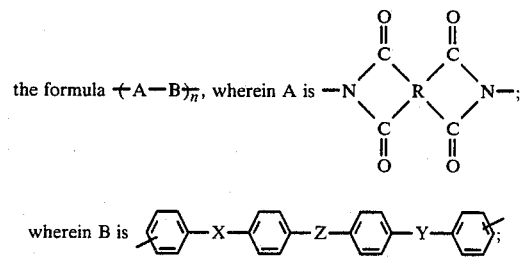

wherein B is

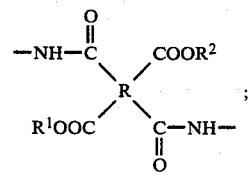

wherein R may be an aliphatic organic tetravalent radical containing at least two carbon atoms with no more than two carbonyl groups being attached to any one carbon atom of said tetravalent radical or wherein R may be a cycloaliphatic or aromatic tetravalent radical containing at least one ring with the four carbonyl groups being attached directly to separate carbon atoms in one or two rings of said radical and with each pair of carbonyl groups being attached to adjacent carbon atoms in said ring or rings of said radical; wherein Z is oxygen or sulfur; wherein X and/or Y may be a carbonyl (CO) or carbinol (CHOH) group; wherein the nitrogens may be independently attached to the benzene rings in the 2-, 3-, or 4-positions; wherein isomerism is present when X and/or Y is a carbinol group; and wherein n is greater than 1 and equals the number of mers per molecule.

The corresponding polyamic acid and ester intermediates have recurring units of the formula $-(A'-B)_n$, wherein A' is $$\begin{array}{c} O \\ \| \\ -NH-C \\ \diagup \\ R^1OOC \end{array} \begin{array}{c} COOR^2 \\ \diagup \\ R \\ \diagdown \\ C-NH- \\ \| \\ O \end{array} ;$$

wherein $R^1$ and $R^2$ may be hydrogen or the same or different hydrocarbon monovalent radicals and wherein B, R, the nitrogen positions, and n are defined as hereinabove.

The primary aromatic diamines have the formula

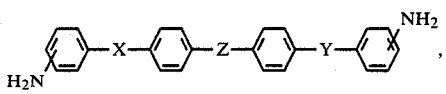

wherein the amine groups may be independently attached to the benzene rings in the 2-, 3-, or 4-positions and wherein X, Z and Y are as defined hereinabove. All the diamines containing the thio linkage are novel compounds prepared by hydrogenating the corresponding nitro compounds, preferably first to the corresponding carbonyl-containing diamine and subsequently to the corresponding carbinol-containing diamine or mixed carbonyl- and carbinol-containing diamine. The diamines containing the ether linkage are novel compounds when one or two carbinol groups are present; they are prepared in a similar manner to the diamines containing the thio linkage.

In the second embodiment herein, novel end-capped polyimides are prepared by reacting a tetracarboxylic acid compound, e.g. dianhydride, with the selected primary aromatic diamines discussed hereinabove and with a polymerizable or inert monoanhydride and/or a polymerizable or inert primary monoamine which act as the end-capping groups. When a polymerizable monoanhydride or monoamine is used, it is preferred to form a low molecular weight polyimide prior to reaction with the endcapping reagent. Typically, the reaction is carried out in an organic solvent at a low or moderately elevated temperature. The stable, soluble polyimides end-capped with polymerizable groups may then be heated to initiate the addition polymerization and the formation of the higher molecular weight polymers.

The end-capped polyimides have one or more of the formulas $R^3-A-B)_mR^4$, or $R^3-A-B)_mA-R^3$, or $R^4-B-A-B)_mR^4$,

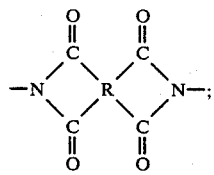

wherein $R^3$ is an inert or polymerizable monovalent organic radical derived from an aliphatic, cycloaliphatic, aromatic, or hetereocyclic primary monoamine; $R^4$ is an inert or polymerizable monovalent organic radical derived from an aliphatic, cycloaliphatic, or aromatic monoanhydride; wherein m equals the number of mers per molecule and m is one or greater; and wherein B and R are as defined hereinabove.

The end-capped polyamic intermediates have one or more of the formulas $R^3-A'-B)_mR^4$, or $R^3-A'-B)_mA'-R^3$, or $R^4-B-A'-B)_mR^4$, wherein A' is

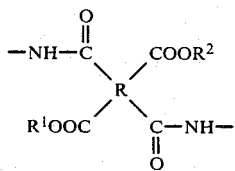

and wherein B, R, $R^1$, $R^2$, $R^3$, $R^4$, and m are as defined hereinabove.

DESCRIPTION OF THE PREFERRED EMBODIMENTS

Preparation of the Diamines

The classes of primary aromatic diamines for use herein include 4,4'-bis(aminobenzoyl)diphenyl ether and the novel ether derivatives 4,4'-bis[(aminophenyl)hydroxymethyl]diphenyl ether and 4-(aminobenzoyl)-4'-[(aminophenyl)hydroxymethyl]diphenyl ether, as well as all the corresponding classes of novel thio ethers. The diamines may be prepared by any of the methods conventionally used to prepare aromatic primary amines, such as reduction of the nitro compound or reaction of aryl halides with ammonia. Reduction of the nitro compounds is the simplest and most satisfactory method, and it may be accomplished by catalytic hydrogenation using molecular hydrogen or by chemical reduction using a metal and an acid. Hydrogenation is the preferred method since the dinitro compounds are quantitatively reduced to the diamine compounds; this is an important requirement for obtaining high molecular weight polymers.

The compounds useful as precursors for the aromatic diamines herein may be prepared in very high yields by reacting a 2-, 3-, or 4-nitrobenzoyl halide or mixtures thereof with diphenyl ether or dipheny sulfide in the presence of aluminum chloride or other Lewis acid to give the corresponding dinitro compound which is subsequently reduced. Alternatively, a 2-, 3-, or 4-halonitrobenzoyl halide or mixtures thereof may be reacted with diphenyl ether or diphenyl sulfide to give the corresponding dihalogen compound which is subsequently treated with ammonia.

Hydrogenation of 4,4'-bis(3-nitrobenzoyl)diphenyl ether under mild conditions using palladium on charcoal as the catalyst reduces only the nitro groups leaving the carbonyl groups intact. Subsequent reduction of the diamine using sodium borohydride as the catalyst reduces both carbonyl groups to carbinol groups. Hydrogenation of the corresponding thio ether using palladium on charcoal reduces only the nitro groups leaving the carbonyl groups intact. Hydrogenation of 4,4'-bis(4-nitrobenzoyl)diphenyl ether palladium on charcoal reduces, not only the nitro groups, but also some carbonyl groups and the resulting amine is a mixture. The diamines containing carbinol group(s) are a mixture of stereoisomers (R, L, and meso) due to the presence of one (or two) asymetric carbon atoms in the chain.

By selecting suitable catalysts and reaction conditions the skilled practitioner can selectively reduce only nitro groups to amine groups, subsequently reduce the carbonyl groups to carbinol groups or to a diamine mixture containing carbinol as well as carbonyl groups, or simultaneously reduce the nitro and carbonyl groups.

Preparation of the Polyimides and Polyamic Acid or Ester Intermediates

One or more of the diamines described herein above are reacted in a suitable inert organic solvent with one or more tetracarboxylic acid compound selected from the following group:

(a) dianhydrides of the formula 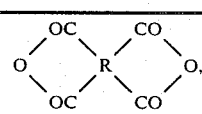

(b) tetraacids of the formula 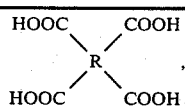

(c) tetraesters of the formula 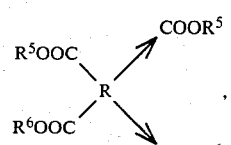

(d) diester-diacids of the formula 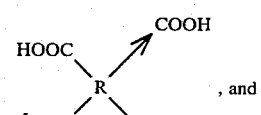, and (e) dihaloformyldiesters of the formula 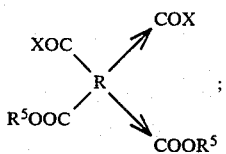;

wherein R is the tetravalent organic radical as hereabove defined; $R^5$ and $R^6$ may be the same or different hydrocarbon monovalent radicals, each preferably containing from 1 to 13 carbon atoms (e.g. $C_1$–$C_{13}$ alkyl radicals or $C_6$–$C_{13}$ cycloalkyl or aryl radicals); X is a halogen atom, preferably chlorine or bromine; and the arrows indicate isomerism.

Typical dianhydrides suitable for use herein include, for example, 2,2′,3,3′-, 2,3,3′,4′-, or 3,4,3′,4′-benzophenone tetracarboxylic acid dianhydride, pyromellitic dianhydride, 2,2′,3,3′- or 3,3′,4,4′, biphenyltetracarboxylic acid dianhydride, thiophene 2,3,4,5-tetracarboxylic acid dianhydride, 2,2-bis(3,4-dicarboxyphenyl)-propane dianhydride, bis(3,4-dicarboxyphenyl sulfone dianhydride, perylene 3,4,9,10-tetracarboxylic acid dianhydride, ethylenetetracarboxylic acid dianhydride, 1,2,3,4-butanetetracarboxylic acid dianhydride, bis-(3,4,dicarboxyphenyl)ether dianhydride, and the like. A more extensive listing of suitable dianhydrides may be found in U.S. Pat. No. 3,699,074 issued Oct. 17, 1972 to H. R. Lubowitz et al. Suitable tetracarboxylic acids are listed in U.S. Pat. No. 3,678,005 issued July 18, 1972 to G. Rabilloud et al. Diester diacids derived from the above dianhydrides by reaction with an alcohol are also suitable for use herein.

Reaction conditions used for the preparation of the intermediate will depend, not only upon the aromatic diamine used, but more particularly on the tetracarboxylic acid compound used. It will also depend upon the solvent selected and the percentage and molecular weight of the intermediate desired in the final solution. The preferred methods of preparing the polyamic acid or ester intermediates are by reaction of diamines with either dianhydrides or diester-diacids derived from lower alcohols. The reactions are carried out under anhydrous conditions preferably using pure monomers and dry solvents.

The solvents used should dissolve at least one of the reactants, preferably both the dianhydride and diamine. Provided imidization has not proceeded too far and provided the intermediate is soluble, the solvent should maintain the polyamic acid or ester in solution. Suitable solvents include, for example, N,N-dimethylformamide, N,N-dimethylacetamide, dimethyl sulfoxide, 1-methyl-2-pyrrolidinone, tetramethylurea, and the like. These solvents can be used alone or in combination with other solvents such as benzene, benzonitrile, dioxane, xylene, toluene, and cyclohexane.

The diamine-dianhydride reaction is relatively rapid at low temperatures. It is typically carried out by first dissolving the diamine in the dry solvent, adding the powdered dianhydride or a dilute solution thereof in portions while applying external cooling, and maintaining the temperature at about 10°–60° C. for about 1 to 6 hours. If pyromellitic dianhydride is used, a somewhat higher temperature may be required to dissolve the dianhydride (preferably below 75° C.).

In a preferred method, the dianhydride is first reacted with an anhydrous lower alcohol, such as methanol or ethanol, to form the corresponding diester-diacid. The diamine and solvent are then added and the excess alcohol distilled off. Alternatively, the diester-diacid may be recovered from the excess alcohol and then added to the dissolved diamine or both diamine and diester-diacid may be separately dissolved and combined. The reaction mixture is heated at about 100°–150° C., while continuing to distill off alcohol and water, until the desired molecular weight is reached at which point the reaction vessel is cooled. Since the polymerization does not proceed at lower temperatures, the molecular weight is controlled by the time and temperature of reaction. If desired, a low molecular weight intermediate may be formed and then post cured, during use, to the higher molecular weight intermediate prior to full imidization. Alternatively, a high molecular weight intermediate, which requires no post cure, can be prepared.

Generally the polyamic acid or ester intermediate is obtained at 40 to 70% solids when low molecular weight intermediates are formed and at 10 to 40% solids when high molecular weight intermediates are formed. The solution stability of the intermediates is sensitive to temperature, concentration, and moisture. Concentrated solutions are more stable than dilute solutions and can be stored for long periods at low temperatures if protected from moisture.

After formation of the polyamic acid or ester intermediate, the polyimide is obtained by heating the intermediate to about 300° C. or by treating the intermediate with chemical cyclizing agents at temperatures of about 100° C. or lower. Typical cyclizing agents include a dehydrating agent (e.g. acetic anhydride) in combination with a basic catalyst (e.g. pyridine) or a carbodiimide (e.g. dicyclohexylcarbodiimide). A combination of chemical and thermal cyclization may be used.

Preparation of the End-Capped Polyimides

The end-capped polyimides are prepared by coreacting stoichiometric equivalents of one or more of the above dianhydrides, one or more of the above diamines, and selected primary monoamines and/or monoanhydrides. The molecular weight is controlled by the stoichiometry. Preferably, the monoamine and/or monoanhydride should be present in an amount sufficient to completely end-cap the polymer depending upon its molecular weight. It is thus essential that the total chemical equivalents of primary amine (i.e. diamine or diamine plus monoamine) equal the total equivalents of anhydride (i.e. dianhydride or dianhydride plus monoanhydride). If both end groups are not to be capped, then equivalent amounts of primary amine and anhydride are not necessary.

The monoanhydrides and monoamines suitable for use herein are those which are inert or thermally polymerizable by an addition reaction so that no volatile gases are formed as a by-product. Typical of such polymerizable monofunctional reactants are endo-cis-5-norbornene-2,3-dicarboxylic anhydride, often called Nadic anhydride (trademark of Allied Chemical Co.), maleic anhydride, 3-aminophenyl acetylene, 3-cyanoaniline, and the like. Typical inert monofunctional reactants are phthalic anhydride, 4-acetamido-phthalic anhydride, 4-acetamido-aniline, and the like.

Polymerization to low molecular weight, substantially completely imidized polymers can be carried out in two or three steps using the conventional reaction conditions and solvents discussed hereinabove. Preferably, the dianhydride and diamine are reacted in a suitable solvent to form a comparatively low molecular weight, soluble polyamic acid or ester intermediate; then the intermediate is reacted with the monofunctional reactant(s) to end-cap the intermediate; and finally the end-capped intermediate is imidized until ring closure is substantially complete as indicated by the cessation of the formation of volatile by-product(s). If the dianhydride, diamine, and monofunctional reactant are polymerized in one step, it is more difficult to control the molecular weight and insoluble intermediates and/or insoluble fully imidized polymers may be formed. It may be possible to recover the insoluble resin, to isolate the soluble resin by coagulation with a miscible, non-solvent such as water, and to blend various proportions of the two resins in the presence or absence of a liquid vehicle. If a liquid is used, it is removed prior to thermal conversion (curing) to the higher molecular weight addition polymer. The purpose of the blend is to form a homogeneous mass which can be fused at a temperature below that at which the end-capped polyimide homopolymerizes.

Curing of the end-capped polymer may be achieved at moderately high temperatures (e.g. about 175°–600° C.), if necessary with the use of moderate to high pressure (about 15–1000 p.s.i.). The conditions required will, of course, depend upon the monofunctional reactant(s) used. In some cases, a catalyst may facilitate the cure or a post-cure after the desired application may be desirable.

Use of the Resins

Both the thermoplastic and thermosetting resins, which may or may not be fully imidized and which may or may not be crosslinked depending upon the presence or absence of carbinol groups, can be used as moldings or adhesives.

The resulting polyamic acid or ester solutions or end-capped polyimide solutions herein, which are usually smooth viscous solutions, can be applied to suitably prepared substrate surfaces; if desired, they may be formulated with fillers, thickeners, pigments, etc. They may be used with or without supports such as glass fabric. Alternatively, they may be cast into a film from solution and then applied or even applied as a slurry or melt. If necessary, the substrates are allowed to stand to permit some or all of the solvent to evaporate. The treated surfaces to be bonded are assembled together by means of a clamp or press and the assembled substrates are heated. If a polyamic acid or ester is used, the assembled substrates are heated to a temperature above the intermediate's glass transition temperature for a time sufficient to effect ring closure, to volatilize the by-product formed, and, if necessary, to volatize some or all of the solvent. If a polymerizable end-capped polyimide is used, the assembled structures are heated to a temperature sufficient to activate the end groups and form the higher molecular weight addition polymer. If fully imidized and/or polymerized to the desired degree prior to application, no post cure after application is needed. A post cure may be desirable to effect crosslinking in the polyimides containing carbinol groups. Because the adhesives adhere to a variety of different materials, including metals, non-metals, ceramics, etc., they may be utilized in a large number of applications.

The resins can also be used to form filled or unfilled molded articles. The end-capped polyimide resins are especially useful for preparing molded articles since the subsequent curing does not form a volatile by-product and the molded articles are void-free. Compression molding temperatures will depend upon whether the resin is thermoplastic or thermosetting. Thermosetting resins are typically heated at about 330°–350° C. and about 3000–5000 p.s.i., and the resin is kept in the mold for at least 5 minutes for good flow prior to cooling to about 250° C. or less for demolding. Thermoset resins and some thermoplastics that behave like thermosets can be compression molded at about 218° C./3000 p.s.i in 2–10 minute cycles, transfer molded at about 193° C./3000 p.s.i. in 1–5 minute cycles, injection molded at about 10,000 p.s.i. in 60 second cycles with mold temperatures of about 238° C. and barrel temperatures of about 93° C., or free sintered to about 249° C. after a 15 second/15,000 p.s.i. cold forming.

It can be appreciated by the practitioner that a large number of variations may be effected in the selection of tetracarboxylic acid compounds and in the preparation and use procedures described herein without materially departing from the scope and spirit of the invention. Such variations will be apparent to those skilled in the art and are to be included within the scope of this invention.

The following examples will more fully illustrate the embodiments of this invention. In the examples, all parts and percentages are given by weight and all temperatures are in degrees Celsius, unless otherwise noted. Inherent viscosities were determined on 1 g./dl. solutions at 25° C. in a mixture of 86% 1-methyl-2-pyrrolidinone and 14% methanol unless otherwise noted. The lap shear strength was determined using chromic acid treated aluminum panels having the dimensions 2.54 cm. by 15.2 cm. by 0.16 cm. A small amount of the polymer solution was applied to the surface of one panel near one edge. The second panel was pressed against the first to form an adhesive film such that there was a 1.27 cm. overlap for each panel and hence a bonding area of 3.22 cm.$^2$. The panels were clamped together by means of a spring clip, and dried at 150° C. and cured at 275° C. After equilibration to ambient temperature, the panels were pulled apart with an Instron Tensile Tester at a crosshead operation speed of 0.05 in./min. The values given were the average of two determinations.

EXAMPLE I

This example described the preparation of a polymer by the reaction of 4,4'-bis(3-aminobenzoyl)diphenyl ether with the methyl diester of 3,3', 4,4'-benzophenone tetracarboxylic acid and its use as an adhesive. It also describes the preparation of 4,4'-bis-(3-nitrobenzoyl)-diphenyl ether and its subsequent reduction to the corresponding diamine.

A total of 242.7 parts (1.82 moles) of aluminum chloride was added over 1 hr. to a cooled solution of 102.1 parts (0.60 mole) diphenyl ether and 233.8 parts (1.26 moles) 3-nitrobenzoyl chloride in 600 ml. of 1,2-dichloroethane. The temperature was maintained at between 10°-20° C. during the addition. The mixture was then slowly heated to the boiling point and refluxed for 3 hr. The solution was cooled and poured into 1700 ml. of a mixture of ice water and concentrated hydrochloric acid (7.5:1). The aqueous layer was decanted off. The product was washed with 1000 ml. ethanol, filtered, dried, and recrystallized from methyl isobutyl ketone. The resulting 4,4'-bis(3-nitrobenzoyl)diphenyl ether had a melting point of 174°-175° C. (literature 175° C.).

A total of 70.2 parts (0.15 mole) of the above dinitro compound in 550 ml. dioxane was hydrogenated at 70°-80° C. using 3.6 parts of 5% palladium on charcoal as the catalyst. Hydrogenation was continued until hydrogen absorption ceased. The solution was filtered, and the product was precipitated by the addition of 500 ml. water. The resulting 4,4'-bis(3-aminobenzoyl)diphenyl ether had a melting point of 131°-133° C. (literature 150°-151° C.); NMR analysis indicated that the carbonyl groups were unaffected by the reduction.

A mixture of 9.67 parts (0.03 mole) of 3,3', 4,4'-benzophenone tetracarboxylic acid dianhydride and 20 ml. of methanol was refluxed for 2 hr. with stirring to form the corresponding methyl diester. A total of 12.25 parts (0.03 mole) of the above diamine and 18 parts of 1-methyl-2-pyrrolidinone was added, and the mixture was heated under a nitrogen atmosphere at 77°-125° C. for 7 hr. The distillate was collected in a 25 ml. Dean-Stark receiver. The resulting polymer had an inherent viscosity of 0.20 dl./g. It was used to bond chromic acid treated aluminum panels using the procedure previously described. The adhesive's lap shear strength was 2640 p.s.i.

EXAMPLE II

This example describes the preparation of a polymer by the reaction of pyromellitic dianhydride and the diamine of Example I.

A total of 8.17 parts (0.02 mole) of 4,4'-bis(3-aminobenzoyl)diphenyl ether in 30 parts 1-methyl-2-pyrrolidinone was treated over a 7 min. period with 4.36 parts (0.02 mole) of pyromellitic dianhydride. The residual dianhydride was washed in with 7 parts of 1-methyl-2-pyrrolidinone. The temperature rose to about 35° C. and gradually dropped back to ambient temperature. The solution was stirred for 5 hr. The resulting polymer had an inherent viscosity of 0.54 dl./g. in 1-methyl-2-pyrrolidinone. It was used as an adhesive as previously described; the lap shear strength was 880 p.s.i.

EXAMPLE III

This example describes the preparation of the novel diamine 4,4'-bis[(3-aminophenyl)hydroxymethyl]diphenyl ether and its polymerization with the methyl diester of 3,3', 4,4'-benzophenone tetracarboxylic acid.

A cooled solution (0.08 mole) of 32.6 parts of 4-4'-bis(3-aminobenzoyl)diphenyl ether (see Example I for the preparation thereof) in 200 ml. tetrahydrofuran was treated over a 1.5 hr. period with a solution of 6.05 parts (0.16 mole) sodium borohydride in 80 ml. water. The reaction mixture was maintained at room temperature for 3 days and then diluted with 100 ml. water. The solvent was removed by vacuum distillation. The product was dissolved in 200 ml. methyl ethyl ketone, washed with water, dried over magnesium sulfate, and precipitated by the addition of 3 volumes of cyclohexane. It was dissolved in methanol and vacuum dried to yield 28.8 parts of a mixture of stereoisomers of 4,4'-bis[(3-aminophenyl)hydroxymethyl]diphenyl ether having a melting point of 55°-66° C.

The polymerization was carried out using the procedure described in Example I except that the mixture was heated for only 1.5 hr. since longer heating times led to gellation of the polymer. The amounts of reactants used were 9.67 parts (0.03 mole) 3,3', 4,4'-benzophenone tetracarboxylic acid dianhydride, 20 ml. methanol, and 12.37 parts (0.03 mole) of the above diamine in 22 parts 1-methyl-2-pyrrolidinone. The resulting polymer had an inherent viscosity of 0.28 dl./g.

EXAMPLE IV

This example describes the preparation of a novel diamine mixture containing some carbinol groups and its polymerization with the methyl diester of 3,3',4,4'-benzophenone tetracarboxylic acid. It also describes the preparation of 4,4'-bis(4-nitrobenzoyl)diphenyl ether and its subsequent reduction to the corresponding diamine mixture.

4-Nitrobenzoyl chloride was reacted with diphenyl ether using the quantities and procedure of Example I. The resulting 4,4'-bis(4-nitrobenzoyl)diphenyl ether was recrystallized from γ-butyrolactone; it had a melting point of 230°-232° C. (literature 226° C.).

A total of 58.5 parts (0.125 mole) of the above dinitro compound in 500 ml. dimethylformamide was hydrogenated at 60°-70° C. in the presence of 3 parts of 5% palladium on charcoal until the rate of hydrogen uptake decreased. The product was precipitated by the addition of 1000 ml. of water. The yield was 38.5 parts (75.5%). The resulting diamine, which was probably a mixture of 4,4'-bis(4-aminobenzoyl)diphenyl ether (literature m.p. 177°-178° C.) and the novel diamines 4-(4-aminobenzoyl)-4'-[(4-aminophenyl)hydroxymethyl]-diphenyl ether, 4-[(4-aminophenyl)hydroxymethyl)]-4'-(4-aminobenzoyl)diphenyl ether, and 4,4'-bis[(4-aminophenyl)hydroxymethyl]diphenyl ether, had a melting point of 152°-154° C. NMR analysis indicated that about 10% of the carbonyl groups were reduced to carbinol groups.

The polymerization was carried out using the procedure described in Example I except that the mixture was heated for only 1.5 hr. The amount of reactants used was 9.67 parts (0.03 mole) 3,3',4,4'-benzophenone tetracarboxylic acid dianhydride, 20 ml. methanol, and 12.24 parts (0.03 mole) of the above diamine mixture in 22 parts 1-methyl-2-pyrrolidinone. The resulting polymer had an inherent viscosity of 0.15 dl./g. When cured and evaluated as previously described, the adhesive had a tensile lap shear strength of 4200 p.s.i.

EXAMPLE V

This example describes the preparation of the novel diamine 4,4'-bis(3-aminobenzoyl)diphenyl sulfide and its polymerization with the methyl diester of 3,3',4,4'-benzophenone tetracarboxylic acid. It also describes the preparation of 4,4'-bis(3-nitrobenzoyl)diphenyl sulfide and its subsequent reduction to the novel diamine.

A mixture of 46.6 parts (0.25 mole) of diphenyl sulfide and 98.4 parts (0.53 mole) of 3-nitrobenzoyl chloride in 250 ml. 1,2-dichloroethane was treated with 101.9 parts (0.76 mole) aluminum chloride using the procedure described in Example I. The crude product was recrystallized from γ-butyrolactone. The resulting 4,4'-bis(3-nitrobenzoyl)diphenyl sulfide had a melting point of 229°–230° C. (literature 229°–230° C.).

A total of 36.3 parts (0.075 mole) of the above dinitro compound in 375 ml. dimethylformamide was hydrogenated at 100°–110° C. using 3.6 parts of 5% palladium on charcoal as the catalyst. The mixture was filtered, and the product was precipitated by the addition of 600 ml. of water. The resulting 4,4'-bis(3-aminobenzoyl)diphenyl sulfide had a melting point of 163°–164° C. The yield was 30.3 parts (95.2%). NMR and infrared spectroscopy confirmed the presence of the carbonyl groups.

The polymerization was carried out using the procedure described in Example I except that the solution was cooled prior to the addition of the diamine and the final solution was heated for 1.5 hr. at 110°–145° C. after the removal of the excess methanol. The reactant amounts used were 6.44 parts (0.02 mole) 3,3',4,4'-benzophenone tetracarboxylic acid dianhydride, 13 ml. methanol, and 8.49 parts (0.02 mole) of the above novel diamine in 15 parts 1-methyl-2-pyrrolidinone. The resulting polymer had an inherent viscosity of 0.15 dl./g. It was used as an adhesive as previously described; the lap shear strength was 2800 p.s.i.

EXAMPLE VI

This example describes the preparation of a polyimide of 3,3',4,4'-benzophenone tetracarboxylic acid dianhydride and 4,4'-bis-(3-aminobenzoyl)diphenyl ether which is end-capped with the polymerizable primary monoamine 3-aminophenyl acetylene.

A solution of 8.06 parts (0.025 mole) 3,3',4,4'-benzophenone tetracarboxylic acid dianhydride in 20 parts 1-methyl-2-pyrrolidinone at room temperature was treated in portions with 8.17 parts (0.020 mole) 4,4'-bis(3-aminobenzoyl)diphenyl ether (see Example I for the preparation of this diamine). Residual diamine was washed in with 4 parts 1-methyl-2-pyrrolidinone, and the reaction mixture was stirred for 1 hr. at 50°–66° C. A total of 1.17 parts (0.010 mole) 3-aminophenyl acetylene in 3 parts 1-methyl-2-pyrrolidinone was added, and the reaction mixture was allowed to remain overnight at ambient temperature. The flask was equipped with a 25 ml. Dean-Stark trap and 40 ml. of toluene were added. The solution was refluxed for 6.5 hr. while the water was collected and the toluene was returned. The toluene was then removed by vacuum distillation. The resulting end-capped polymer had an inherent viscosity of 0.12 dl./g.

EXAMPLE VII

This example describes the preparation of a polyimide of 3,3',4,4'-benzophenone tetracarboxylic acid dianhydride and 4,4'-bis-(3-aminobenzoyl)diphenyl ether which is endcapped with the polymerizable monoanhydride endo-cis-5-norbornene-2,3-dicarboxylic. If one does not wish to form the polymerizable polyimide, the polyimide may be end-capped with phthalic anhydride using the mole ratios given below.

A solution of 10.21 parts (0.025 mole) 4,4'-bis(3-aminobenzoyl)diphenyl ether in 20 parts 1-methyl-2-pyrrolidinone at 25° C. was treated with 6.44 parts (0.020 mole) 3,3',4,4'-benzophenone tetracarboxylic acid dianhydride. Residual dianhydride was washed in with 3 parts 1-methyl-2-pyrrolidinone, and the reaction mixture was stirred at 21°–35° C. for 2.5 hr. A total of 1.64 parts (0.01 mole) of endo-cis-5-norbornene-2,3-dicarboxylic anhydride was added followed by 3 parts of 1-methyl-2-pyrrolidinone. The solution was left overnight at room temperature, 40 ml. toluene were added, and the ring closure was carried out as in Example VI. The end-capped polymer had an inherent viscosity of 0.23 dl./g.

Summarizing, this invention is seen to provide novel linear polyimides, optionally end-capped with inert or polymerizable monoanhydride and/or monoamine groups, and the polyamic acid and ester intermediates thereof, as well as novel diamines for use in their preparation.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. A primary aromatic diamine having the general formula:

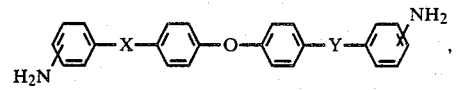

wherein X and Y are carbonyl or carbinol groups with the proviso that both X and Y can not be carbonyl groups; wherein the nitrogen may be independently attached to the benzene rings in the 2-, 3-, or 4-positions; and wherein isomerism is present when X, Y, or X and Y are said carbinol groups.

2. A primry aromatic diamine having the general formula:

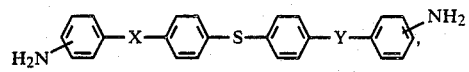

wherein X or Y may be a carbonyl or carbinol groups and X and Y may be the same or different; wherein the nitrogens may be independently attached to the benzene rings in the 2-, 3-, or 4-positions; and where isomerism is present when X, Y, or X and Y are said carbinol groups.

3. The diamine of claim 2, wherein said amine groups are both in the 3-position and X and Y are both carbonyl groups.

4. The diamine of claim 1, wherein said amine groups are both in the 3-positions and X and Y are both carbinol groups.

5. The diamine of claim 1, wherein said amine groups are both in the 4-position and said diamine is a mixture of amines containing carbonyl groups, carbinol groups, and carbonyl and carbinol groups.

6. The process for preparing the diamine of claim 4, which comprises the steps of:
 a. reacting a 3-nitrobenzoyl halide with diphenyl ether in the presence of aluminum chloride or other Lewis acid;
 b. catalytically hydrogenating the resultant 4,4'-bis(3-nitrobenzoyl)diphenyl ether;

c. reducing the resultant 4,4'-bis(3-aminobenzoyl)diphenyl ether; and d. isolating the resultant 4,4'-bis[(3-aminophenyl)hydroxymethyl]diphenyl ether.

7. The process of claim 6, wherein said catalytic hydrogenation is carried out at 70°–80° C. using palladium on charcoal as the catalyst and wherein said reduction is carried out with sodium borohydride.

8. The process for preparing the diamine of claim 5, which comprises the steps of:

a. reacting a 4-nitrobenzoyl halide with diphenyl ether in the presence of aluminum chloride or other Lewis acid;

b. catalytically hydrogenating the resultant 4,4'-bis(4-nitrobenzoyl)diphenyl ether; and c. isolating the resultant mixture of 4,4'-bis(4-aminobenzoyl)diphenyl ether, 4-(4-aminobenzoyl)-4'-[4-aminophenyl)hydroxymethyl]diphenyl ether, 4-[4-aminophenyl)hydroxymethyl]-4'-(4-aminobenzoyl)diphenyl ether, and 4,4'-bis[(4-aminophenyl)hydroxymethyl]diphenyl ether.

9. The proces of claim 8, wherein said catalytic hydrogenation is carried out at 60°–70° C. using palladium on charcoal as the catalyst.

10. The process for preparing the diamine of claim 3, which comprises the steps of:

a. reacting a 3-nitrobenzoyl halide with diphenyl sulfide in the presence of aluminum chloride or other Lewis acid;

b. catalytically hydrogenating the resultant 4,4'-bis(3-nitrobenzoyl)diphenyl sulfide; and c. isolating the resultant 4,4'-bis(3-aminobenzoyl)diphenyl sulfide.

11. The process of claim 10, wherein said catalytic hydrogenation is carried out at 100°–110° C. using palladium on charcoal as the catalyst.

* * * * *